United States Patent [19]

Osanai et al.

[11] Patent Number: 4,642,068
[45] Date of Patent: Feb. 10, 1987

[54] APPARATUS FOR CONTROLLING CONTINUOUSLY VARIABLE TRANSMISSION

[75] Inventors: Akinori Osanai; Takao Niwa, both of Susono, Japan

[73] Assignee: Toyota Jidosha Kabushiki Kaisha, Toyota, Japan

[21] Appl. No.: 654,025

[22] Filed: Sep. 25, 1984

[30] Foreign Application Priority Data

Sep. 28, 1983 [JP] Japan ................................. 58-177892
Oct. 17, 1983 [JP] Japan ................................. 58-192582

[51] Int. Cl.⁴ .............................................. F16H 11/06
[52] U.S. Cl. .......................................... 474/11; 474/28
[58] Field of Search ............................. 474/12, 11, 28

[56] References Cited

U.S. PATENT DOCUMENTS 4,023,425  5/1977  Parker ............................. 474/28 X
4,161,894  7/1979  Giacosa ........................... 474/28 X
4,462,275  7/1984  Mohl ................................ 474/12 X

FOREIGN PATENT DOCUMENTS

0093413  11/1983  European Pat. Off. ............. 474/11

Primary Examiner—Stuart S. Levy
Assistant Examiner—Katherine Matecki
Attorney, Agent, or Firm—Oblon, Fisher, Spivak, McClelland & Maier

[57] ABSTRACT

A continuously variable transmission (hereinafter called CVT) comprises input pulleys, output pulleys and a belt which is trained over the input and output pulleys to transmit a driving torque. Line pressure is used for a force of the pulleys pressed against the belt on the input or output pulleys. The line pressure is adjusted in relation to engine torque which is calculated on the basis of engine speed, an intake throttle position and atmospheric pressure. The line pressure is alternatively adjusted in relation to the atmospheric pressure which is detected from the feedback correction of fuel injection.

4 Claims, 11 Drawing Figures

APPARATUS FOR CONTROLLING CONTINUOUSLY VARIABLE TRANSMISSION

BACKGROUND OF THE INVENTION

1. Field of the Invention:

This invention relates to an apparatus for controlling a continuously variable transmission (hereinafter called CVT) which is used for a transmission system in a vehicle.

2. Description of the Prior Art:

A CVT is used for a power transmission system which is to control continuously speed ratio e (=output side rotational speed/input side rotational speed) to improve the specific fuel consumption of an engine. The CVT has a belt which transmits the engine power from an input side pulley to an output side pulley, and a press force is applied on the input side pulley and the output side pulley, with usually the latter being pressed against the belt and being controlled by line pressure. Thus, the line pressure has to be controlled to necessary minimum value for avoiding the slip of the belt on the pulleys to ensure the transmission of torque and prevent the drive loss of an oil pump. Conventional control systems calculate engine torque Te from an intake throttle position $\theta$ and engine speed Ne irrespective on an altitude on which a vehicle travels and control the line pressure Pl in relation to this engine torque Te. However, while the vehicle travels on a highland, air concentration of the atmosphere is reduced and thereby the engine torque is reduced. Thus, when the line pressure Pl is calculated from the engine torque Te obtained irrespective of the atmospheric pressure Pa, the line pressure Pl becomes too large so that troubles such as drive loss of the oil pump or life shortening of each element like belt in CVT are brought about.

SUMMARY OF THE INVENTION

An object of the present invention is to provide an apparatus for controlling CVT which is to set proper line pressure irrespective of an altitude on which a vehicle travels to eliminate troubles such as the drive loss of an oil pump caused by the excessive line pressure.

According to the present invention to achieve this object, an engine torque Te is obtained as a function of engine speed Ne, throttle position $\theta$ and atmospheric pressure Pa and the line pressure Pl is controlled in relation to the engine torque Te.

As a result of such calculation of the engine torque Te as a function of the atmospheric pressure related to air concentration, the engine torque Te varied in relation to altitude is to be accurately calculated so that the line pressure Pl is properly controlled without being excessive and troubles caused by the excessive line pressure, such as drive loss of an oil pump and life shortening of each element like belt in the CVT, are to be eliminated.

In a preferred embodiment, the basic value Te' of the engine torque is at first obtained from the engine speed Ne and the throttle position $\theta$ and then the product Kt·Te' of the basic value Te' and a correction factor Kt related to the atmospheric pressure Pa is made the engine torque Te from which is calculated the line presure Pl. In this context and as used throughout this disclosure the basic engine torque is defined as a value which although not exactly equal to the actual engine torque is nevertheless approximately equal thereto.

Also, the apparatus for controlling CVT according to the present invention is provided with a control means for controlling the line pressure Pl in relation to the atmospheric pressure.

Thus, when the vehicle moves from a flatland to a highland, the line pressure Pl is prevented from being too larger than a value corresponding to the actual engine torque Te to produce an excessive press force against the belt, so that the degradation of the specific fuel consumption and the life shortening of parts such as the belt, or the like are to be prevented.

While the air fuel ratio of the engine is feedback controlled, the basic fuel injection amount obtained from an engine load, for example, Q/Ne(provided Q is an intake air flow and Ne is engine speed) is corrected in relation to a feedback signal from an oxygen sensor of an exhaust system. Also, to provide a proper value of air fuel ratio in a open loop control period of air fuel ratio such as warming-up or the like, a fuel amount corrected by the feedback signal in the feedback control period is made a learning value and in the next open loop control period, the fuel injection amount is corrected on the basis of the learning value. Since the higher the altitude on which the vehicle travels is to reduce air concentration, the more the feedback correction amount to correct the fuel injection amount for maintaining the air-fuel ratio of mixture at theoretical air-fuel ratio is increased, the atmospheric pressure and the feedback correction amount are in a functional relation to each other. In the preferred embodiment of the present invention, the line pressure Pl is controlled in relation to the feedback correction amount and thus the learning value. Since the learning value is utilized, the atmospheric pressure sensor may be omitted.

Further, according the preferred embodiment of the present invention, the basic value provided by the engine torque on a flatland, i.e., under the reference atmospheric pressure is calculated from the throttle position $\theta$ and the engine speed Ne, the engine torque is calculated from the calculated basic value and the feedback correction amount, thus the learning value and the line pressure is controlled in relation to the engine torque.

The accompanying drawings, which are incorporated in and constitute part of this specification, illustrate embodiments of the invention and, together with the description, serve to explain the principles of the invention.

DETAILED DESCRIPTION OF PREFERRED EMBODIMENTS

Figure 1:
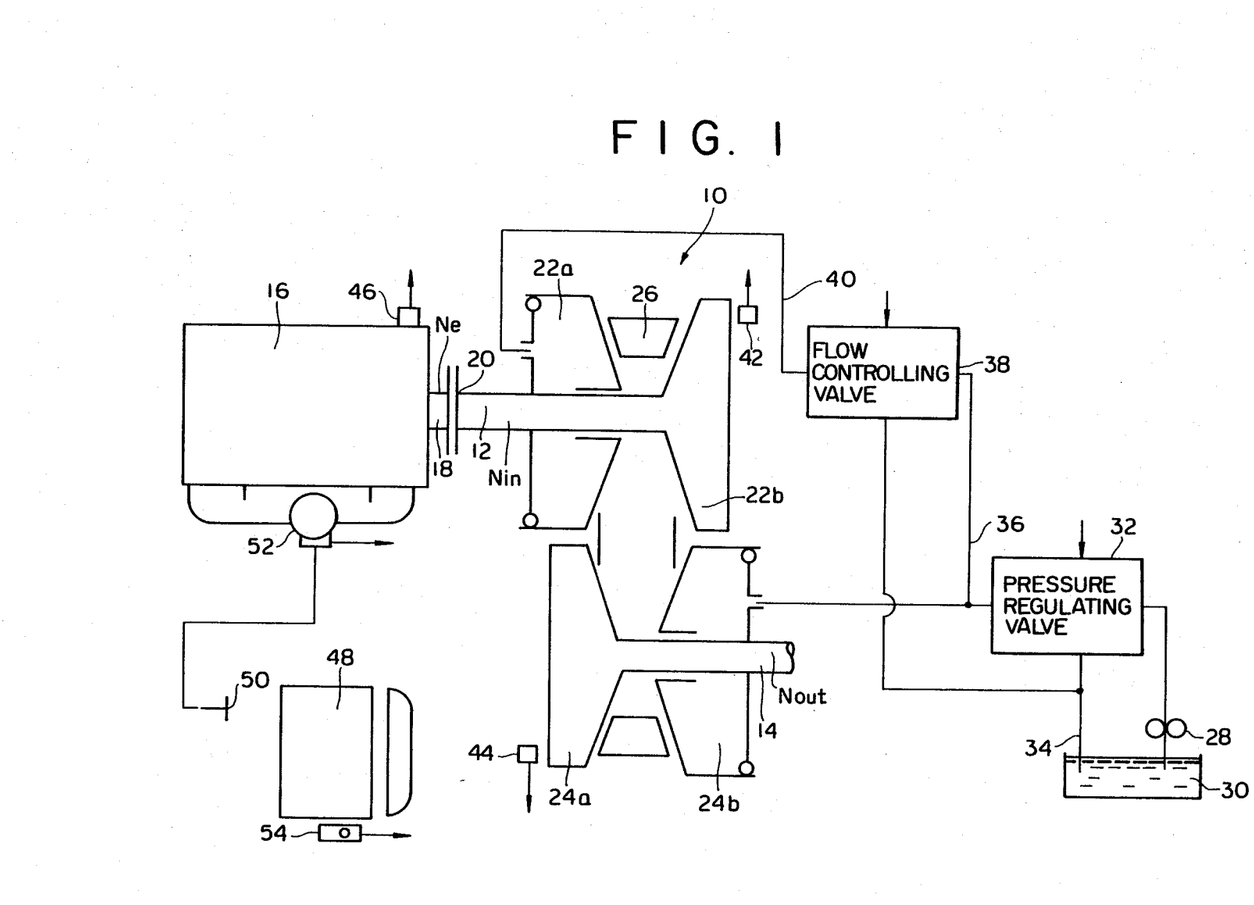
FIG. 1 is a schematic view showing a whole CVT to which the present invention is applied.

In FIG. 1, a CVT 10 is provided with an input shaft 12 and an output shaft 14 parallel to each other. The input shaft 12 is provided coaxially with a crankshaft 18 of an engine 16 and connected to the crankshaft 18 through a clutch 20. Input side pulleys 22a, 22b are provided opposed to each other, one input side pulley 22a being provided on the input shaft 12 movably axially as a movable pulley and rotationally fixedly, and the other input side pulley 22b being fixed to the input shaft 12 as a fixed pulley. Similarly, output side pulleys 24a, 24b are provided opposed to each other, one output side pulley 24a being fixed to the output shaft 14 as a fixed pulley and the other output side pulley 24b being provided on the output shaft 14 axially movably as a movable pulley and rotationally fixedly. Opposed surfaces of the input side pulleys 22a, 22b and the output side pulleys 24a, 24b are tapered and a belt 26 having an equilateral trapezoidal section is trained over the input side pulleys 22a, 22b and the output side pulleys 24a, 24b. An oil pump 28 sends oil from an oil reservoir 30 to a relief valve 32. The relief valve 32 consists of an electromagnetic relief valve for controlling line pressure in an oil path 36 by varying an oil amount escaping to a drain 34, i.e. relief amount, and the line pressure in the oil path 36 is sent to a hydraulic cylinder of the output side pulley 24b and a flow controlling valve 38. The flow controlling valve 38 controls oil supply flow from the oil path 36 to an oil path 40 connected to a hydraulic cylinder of the input side pulley 22a and oil drain flow from the oil path 40 to the drain 34. The press force of the input side pulleys 22a, 22b and the output side pulleys 24a, 24b pressed against the belt 26 is controlled by oil pressure in the input side hydraulic cylinder and the output side hydraulic cylinder, and the engaging radii of the belt 26 on the tapered surfaces of the input side pulleys 22a, 22b and the output side pulleys 24a, 24b are varied in relation to this press force. As a result, the speed ratio e of the CVT 10(=Nout/Nin, provided Nout is the rotational speed of the output shaft 14 and Nin is the rotational speed of the input shaft 12 and in this embodiment Nin=engine speed Ne) is varied. The line pressure in the output side hydraulic cylinder is controlled to the necessary minimum value to avoid the slip of the belt 26 for restraining the drive loss of the oil pump 28 and ensure power transmission, and the speed ratio e is controlled by oil pressure in the input side hydraulic cylinder. Further, while oil pressure in the input side hydraulic cylinder ≦ oil pressure in the output side hydraulic cylinder, pressure receiving area of the input side hydraulic cylinder > pressure receiving area of the output side hydraulic cylinder so that the press force of the input side pulleys 22a, 22b is to be made larger than that of the output side pulleys 24a, 24b. An input side rotational angle sensor 42 and an output side rotational angle sensor 44 detect respectively rotational speed Nin, Nout of the input and output shafts 12,14 and a water temperature sensor 46 detects cooling water temperature of the engine 16.

An accelerator pedal 50 is provided in a driver's seat 48 and a throttle valve in an intake path is interlocked with the accelerator pedal 50 so that a throttle position sensor 52 detects the throttle position θ. A shift position sensor 54 detects the shift range of a shift lever near the driver's seat.

Figure 2:
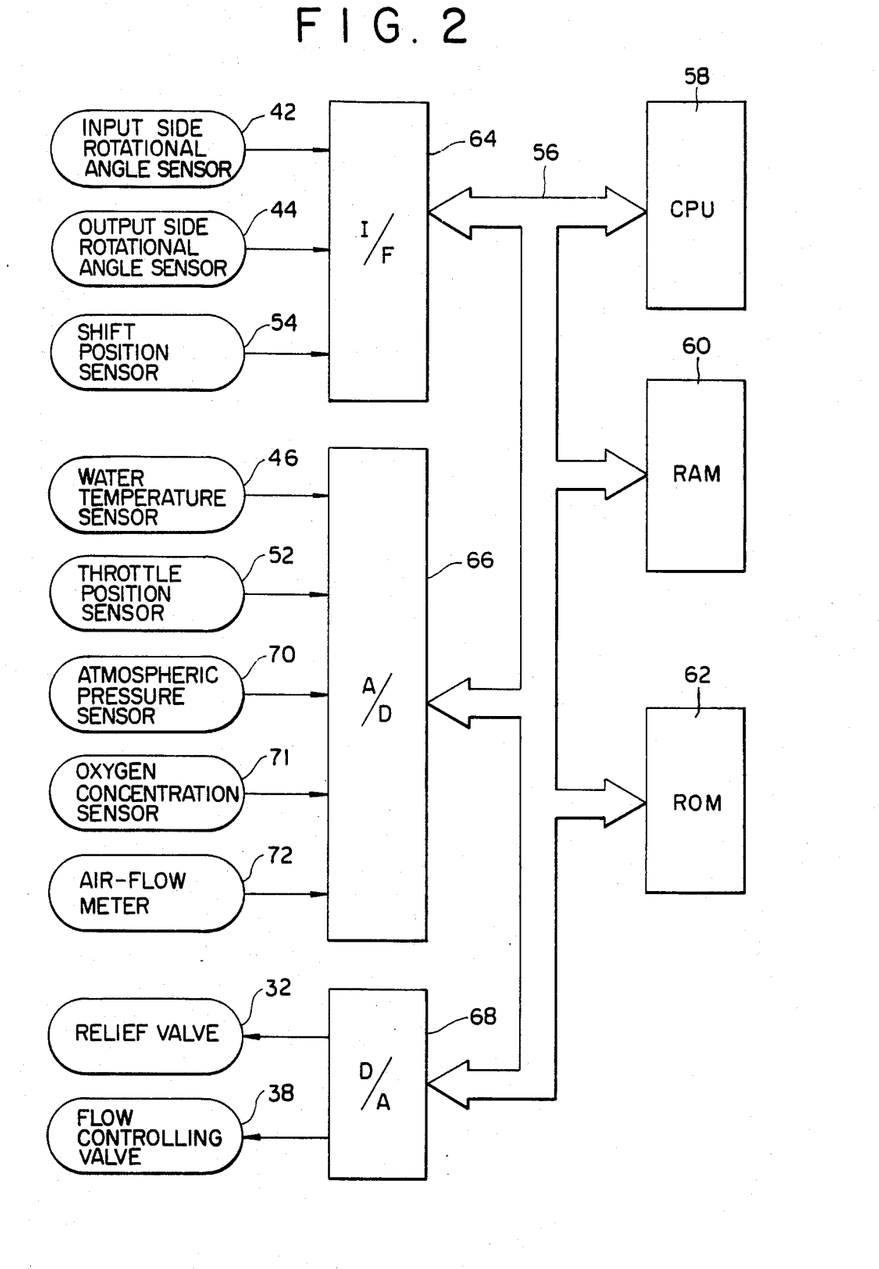
FIG. 2 is a block diagram showing an electronic control unit.

FIG. 2 is a block diagram showing an electronic control unit. An address data bus 56 interconnects CPU 58, RAM 60, ROM 62, I/F(interface) 64, A/D(analog/digital converter) 66 and D/A(digital/analog converter) 68. The I/F 64 receives pulse signals from the input side rotational angle sensor 42, the output side rotational angle sensor 44 and the shift position sensor 54, the A/D 66 receives analog signals from the water temperature sensor 46, the throttle positon sensor 52 and an atmospheric pressure sensor 70 and the D/A 68 sends the output pulse to the relief valve 32 and the flow controlling valve 38. Instead of the atmospheric pressure sensor 70 may be provided a oxygen concentration sensor 71 for detecting oxygen concentration in exhaust and an air flow meter 72 for detecting intake air flow in an intake path.

Figure 3:
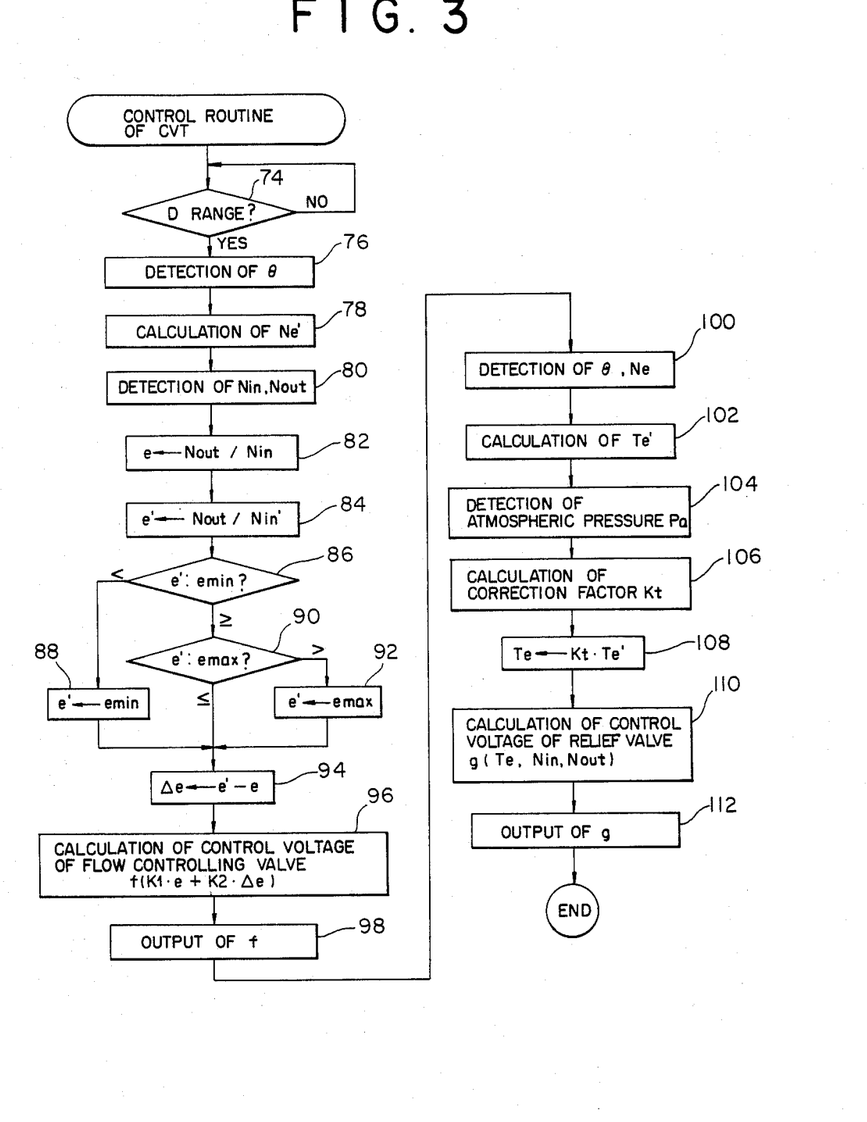
FIG. 3 is a flow chart showing a CVT control routine according to the present invention.
Figure 4:
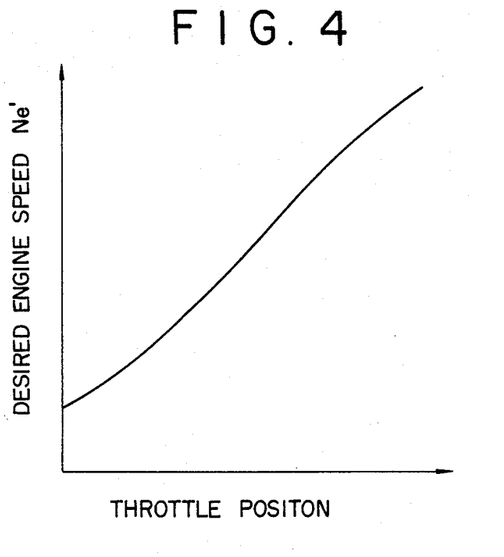
FIG. 4 is a graph showing the relationship between a throttle position and a desired engine speed.
Figure 5:
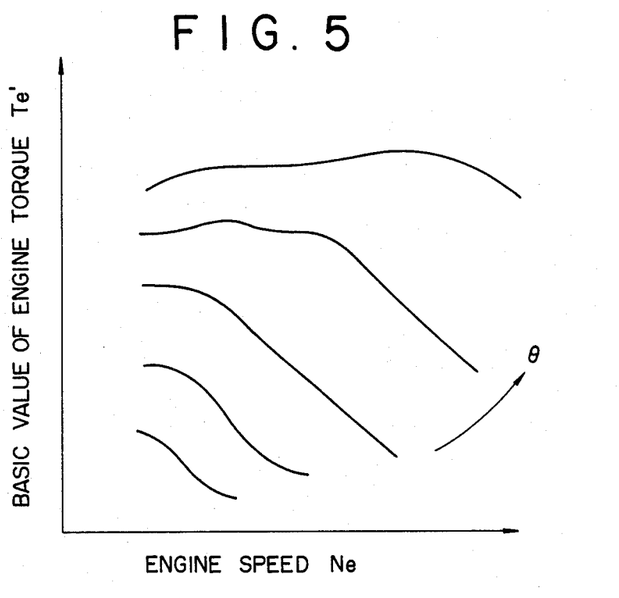
FIG. 5 is a graph showing the relationship between an engine speed, throttle position and a basic value of engine torque.
Figure 6:
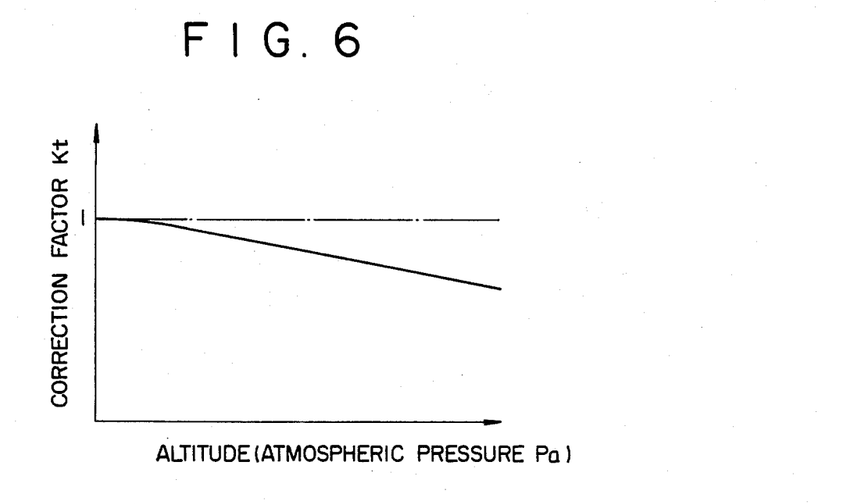
FIG. 6 is a graph showing the relationship between altitude and correction factor of the engine torque.
Figure 7:
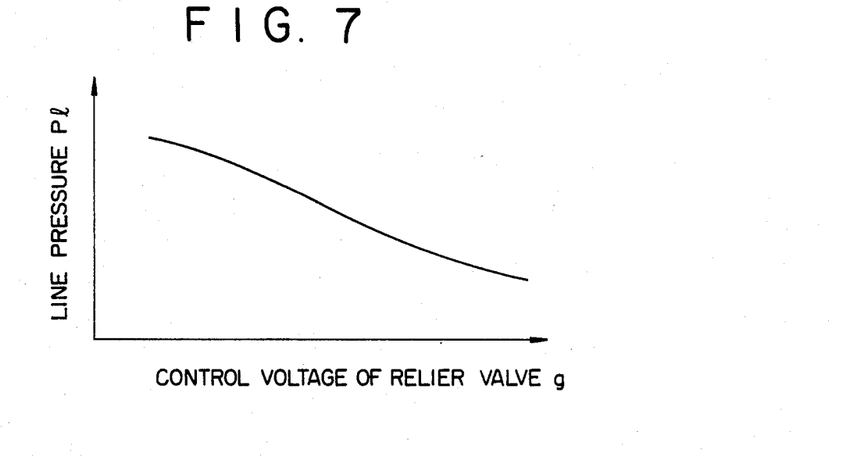
FIG. 7 is a graph showing the relationship between control voltage of a relief valve and line pressure.

FIG. 3 is a flow chart showing a control routine for the CVT 10. Main sections of the present invention are those of steps 104–108. The desired engine speed Ne' is calculated as a function of the throttle position θ and the quotient Nout/Ne' of the output side rotational speed Nout of the CVT 10 divided by the desired engine speed Ne' is made the desired speed ratio e'. The upper and lower limits of the desired speed ratio e' are made respectively the upper limit emax and the lower limit emin of the speed change range of the CVT 10 and then the control voltage f of the flow controlling valve 38 is calculated in relation to the difference Δe between the desired speed ratio e' and the actual speed ratio e. Thus, the speed ratio e is controlled to be the desired speed ratio e' and the actual engine speed Ne becomes the desired engine speed Ne'. Also, the engine torque Te is calculated as a function of the throttle position θ, engine speed Ne and atmospheric pressure Pa, the control voltage g of the relief valve 32 is calculated as a function of the engine torque Te and the line pressure Pl related to the control voltage g is produced in an output port of the relief valve 32. Since the engine torque Te is calculated as a function of the atmospheric pressure Pa, the accurate engine torque Te is to be obtained, and the line pressure Pl is controlled to a proper value without being excessive in spite of the rise of altitude on which a vehicle travels so that the drive loss of the oil pump 28 and the life shortening of each element like the belt 26 in the CVT 10 are prevented. Detailing respective steps, in step 74 is judged whether or not the vehicle is in D(drive) range, and the execution of step 74 is repeated until D range is judged to be positive. In step 76 is detected the throttle positon θ. In step 78 is calculated the desired engine speed Ne' from the throttle position θ. FIG. 4 shows the relationship between the throttle position θ and the desired engine speed Ne'. In step 80 are detected the input side rotational speed Nin and the output side rotational speed Nout of the CVT 10. In step 82 is calculated the actual speed ratio e=Nout/Nin of the CVT 10. In step 84 is calculated the desired speed ratio e'=Nout/Ne'. In steps 86–92 are limited the upper and lower limits of the desired speed ratio e' respectively to the upper limit emax and the lower limit emin of variable speed range of the CVT 10. In step 94 is calculated deviation Δe of the actual speed ratio e from the desired speed ratio e'. In step 96 is calculated the control voltage f of the flow controlling valve 38 as a function of K1·e+K2·Δe, provided K1,K2 are constants. In step 98 is generated the output of f to the flow controlling valve 38. Thus, when the actual speed ratio e is larger than the desired speed ratio e', the control voltage f is lowered to reduce oil flow sent to the input side cylinder. As a result, the speed ratio e is reduced. In the reverse case, oil flow sent to the input side cylinder is increased. As a result the speed ratio e is increased. In step 100 are detected the throttle position $\theta$ and the engine speed Ne. In step 102 is caloulated the basic value Te' of the engine torque as a function of the throttle position $\theta$ and the engine speed Ne. The basic value Te' is calculated as the engine torque corresponding to $\theta$, Ne when the vehicle travels on a flatland. FIG. 5 is a graph showing the relationship between the engine torque Te, throttle position $\theta$ and engine speed Ne. In step 104 is detected the atmospheric pressure Pa. In step 106 is calculated the correction factor Kt from the atmospheric pressure Pa. FIG. 6 shows the relationship between altitude, thus the atmospheric pressure Pa and the correction factor Kt. Kt=1, when the altitude=Om and the correction factor Kt is a diminishing function of altitude. In step 108 is made the product of the correction factor Kt and the basic value Te' the final engine torque Te. In step 110 is calculated the control voltage g of the relief valve 32 as a function of the engine torque Te, the input side rotational speed Nin and the output side rotational speed Nout of the CVT 10. This g is calculated from $g=C\cdot Te/e$ for example, provided C is a constant. In step 112 is sent the output of the control voltage g to the relief valve 32. FIG. 7 shows the relationship between the control voltage g of the relief valve 32 and the line pressure Pl. Since the engine torque Te is reduced as altitude is elevated, the line pressure Pl is also reduced.

Figure 8:
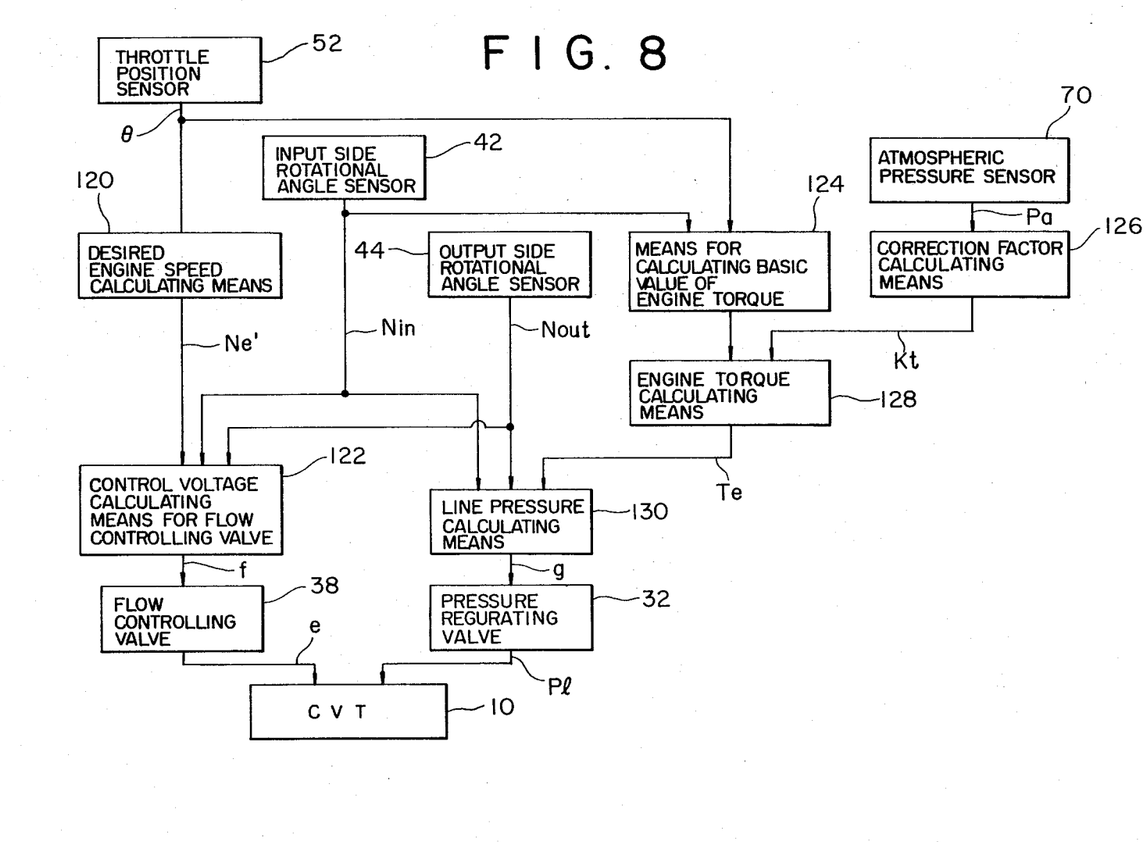
FIG. 8 is a functional block diagram showing the present invention.

FIG. 8 is a functional block diagram showing the present invention. A desired engine speed calculating means 120 calculates the desired engine speed Ne' from the output of the throttle position sensor 52. A control voltage calculating means 122 for the flow controlling valve calculates the speed ratio e and the deviation $\Delta$e from the desired engine speed Ne', the input side rotational speed Nin and the output side rotational speed Nout of the CVT 10 and further calculates the control voltage f from e, $\Delta$e. The flow controlling valve 38 controls oil flow to the input side hydraulic cylinder of the CVT 10 in relation to the control voltage f to thereby change the speed ratio e of the CVT 10. A basic engine torque value calculating means 124 calculates the basic engine torque value Te' from the throttle position $\theta$ and the engine speed Ne(=Nin), and a correction factor calculating means 126 calculates the correction factor Kt from the atmospheric pressure Pa. An engine torque calculating means 128 makes the product Kt·Te' of Kt and Te' the engine torque Te. A line pressure calculating.means 130 calculates the control voltage g of the relief valve 32 from the engine torque Te, the input side rotational speed Nin and the output side rotational speed Nout of the CVT 10. The relief valve 32 produces the line pressure Pl related to the control voltage g.

Figure 9:
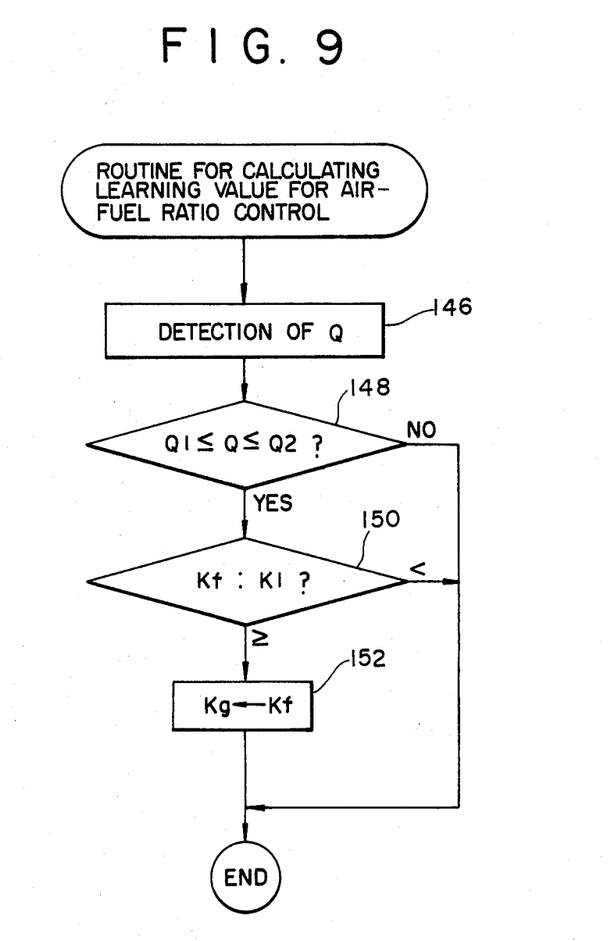
FIG. 9 is a flow chart showing a learning value calculating routine for controlling air-fuel ratio.
Figure 10:
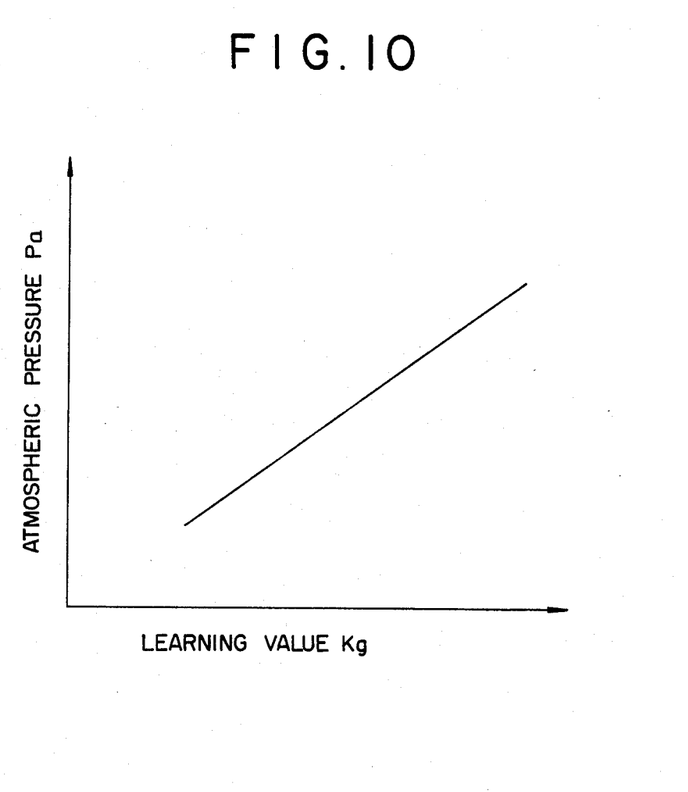
FIG. 10 is a graph showing the relationship between the learning valve and atmospheric pressure.
Figure 11:
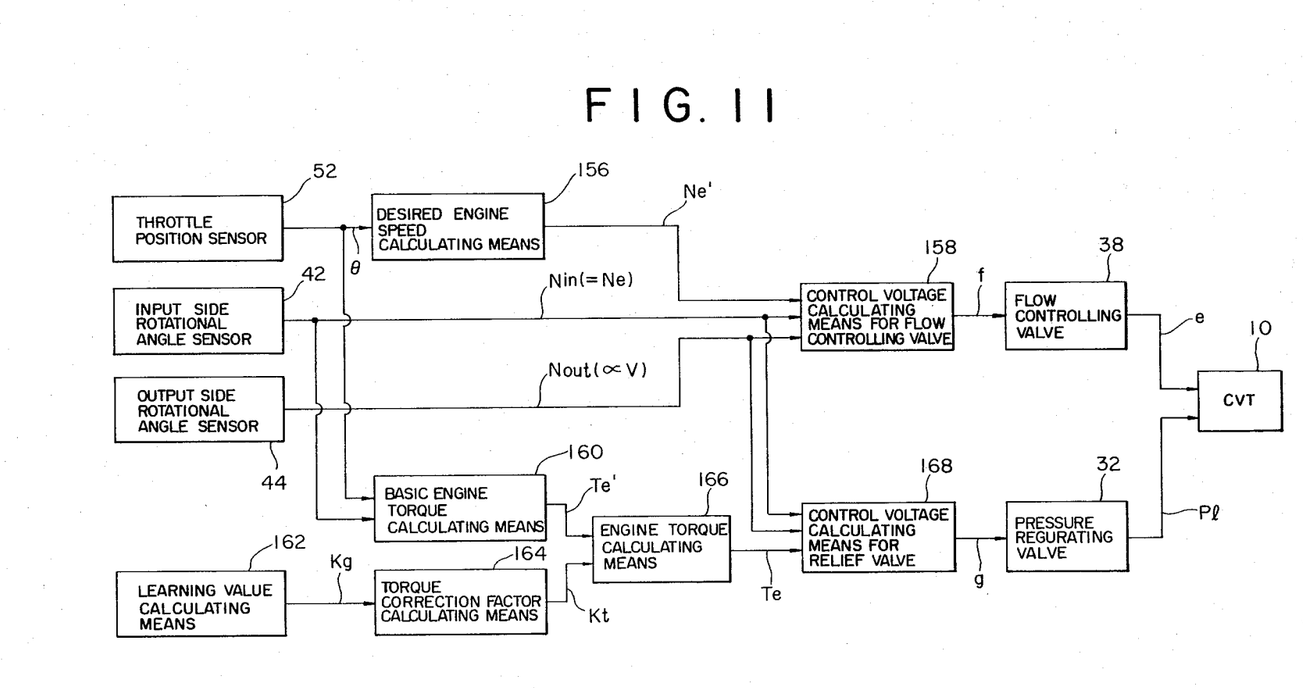
FIG. 11 is a functional block diagram showing the present invention.

In FIGS. 9-11 will be described the other embodiments of the present invention.

FIG. 9 is a flow chart showing a routine of learning value for air-fuel ratio control. This routine is carried out while the air-fuel ratio in the steady state after warming up an engine is feedback controlled. In step 146 is detected intake air flow Q. In step 148 is compared Q with predetermined values Q1,Q2 (provided Q1<Q2) and advance is made to step 150 when Q1$\leq$Q$\leq$Q2, i.e. Q is in a range suitable for calculating the learning value, and the routine is completed when Q is in the other range. In step 150 is compared the feedback correction factor Kf of fuel injection amount with a predetermined value K1 and advance is made to step 152 when Kf$\geq$K1 and the routine is completed when Kf<K1. The fuel injection amount Qf per one time of fuel injection from a fuel injection valve in a period of feedback control is calculated from the following formula example:

$$Qf=(1+Kf)\cdot Qb \quad (1)$$

provided Qb is the basic fuel injection amount calculated from Q/Ne and Kf·Qb is the feedback correction amount of fuel injection amount. Since the feedback correction amount of fuel injection amount is small when Kf<K1, the learning value is not particularly detected. In step 152 is substituted Kf for the learning value Kg. In the open loop control period of air-fuel ratio, the fuel injection amount Qf per one time of fuel injection from the fuel injection valve is calculated from the following formula for example:

$$Qf=(1+Kg+Kx)\cdot Qb \quad (2)$$

provided Kx is a correction factor calculated from other parameters such as cooling water temperature, or the like.

Since in formula (1) the basic fuel injection amount Qb is independent of air concentration, the final fuel injection amount Qf has to be reduced to maintain the air-fuel ratio at the theoretical one in spite of the reduction of air concentration caused by the reduction of atmospheric pressure, and thus Kf, Kg are reduced. FIG. 10 shows the relationship between the learning value Kg and atmospheric pressure Pa. The learning value Kg is reduced as the atmospheric pressure Pa is reduced, showing that the learning value Kg and the atmospheric pressure Pa are in functional relation to each other.

FIG. 11 is afunctional block diagram showing the present invention. A desired engine speed calculating means 156 calculates the desired engine speed Ne' of the engine on the basis of said FIG. 4. A control voltage calculating means 158 for the flow controlling valve calculates the control voltage f of the flow controlling valve 38 from the desired engine speed Ne', the input side rotational speed Nin(=engine speed Ne) and the output side rotational speed Nout ($\infty$vehicle speed V) of the CVT 10 . Referring to the detailed description, the desired speed ratio e' is calculated from e'=Nout/Ne40 , the actual speed ratio e is calculated from e=-Nout/Nin and the control voltage f is changed on the basis of the deviation $\Delta$e=e'-e of the actual speed ratio e from the desired speed ratio e'. Thus, the engine speed Ne is feedback controlled through the control of the speed ratio e of the CVT 10. A basic engine torque calculating means 160 calculates the basic engine torque value Te' from the throttle position $\theta$ and the engine speed Ne on the basis of said FIG. 5. The basic value Te' in said FIG. 5 is set as the engine torque corresponding to the throttle position $\theta$ under the reference atmospheric pressure on a flatland. When air concentration is reduced as altitude on which a vehicle travels is elevated, the engine torque in the same throttle position is reduced. A learning value calculating means 162 calculates the learning value Kg according to a flow chart in FIG. 8. A torque correction factor calculating means 164 calculates the correction factor Kt from the learning value Kg on the basis of said FIG. 6.

The atmospheric pressure Pa is to obtained as a function F(Kg) of the learning value Kg so that the torque correction factor Kt is to be calculated as a function of the learning value Kg. An engine torque calculating means 166 calculates the engine torque Te from a formula $Te=Kt\cdot Tb$. A control voltage calculating means 168 for the relief valve calculates the control voltage g of the relief valve 32 as a function of Te·Nin/Nout. Said FIG. 7 shows the relationship between the control voltage g of the relief valve 32 and the line pressure Pl. The line pressure Pl is controlled in relation to the engine torque Te calculated thus as a function of the learning value Kg so that the excessive press force of the belt 26 is prevented in spite of the reduction of the atmospheric pressure and thus troubles such as the degradation of the specific fuel consumption, the life shortening of the belt 26, or the like, are prevented.

It will be apparent to those skilled in the art that various modifications and variations may be made in the elements of the invention without departing from the scope or spirit of the invention.

What is claimed is:

1. An apparatus for controlling a continuously variable transmission for a vehicle, which vehicle has an engine having a throttle valve and a torque control system for controlling the amount of fuel to be supplied to the engine, in accordance with the engine speed and a parameter of engine load, said transmission comprising:

a hydraulic pressure operated variable width first pulley assembly connected to the engine;
    a hydraulic pressure operated variable width second pulley assembly connected to the vehicle;
    a belt looped between the first and the second pulleys for transmitting engine power to the vehicle;
    a hydraulic pressure source;
    first hydraulic line connecting said source with the first pulley assembly for generating a hydrualic pressure for engaging the first pulley with the belt;
    second hydraulic line connecting the source with the second pulley assembly for engaging the second pulley with the belt;
    first detecting means for detecting the position of the throttle valve;
    first calculating means for calculating a value of control pressure so as to obtain a speed ratio which is a ratio of the vehicle speed to the engine speed and is determined by the detected position of the throttle valve;
    first control valve means arranged in one of the first and the second hydraulic lines for controlling a pressure therein to said control pressure;
    second detecting means for-detecting the engine speed;
    third detecting means for detecting atmospheric pressure;
    means for calculating an actual torque as a function of the engine speed, position of throttle valve and atmospheric pressure;
    second calculating means for calculating a value of line pressure so as to obtian the minimum pressure for engaging the belt with the pulley, which pressure is determined in accordance with the calculated engine torque, and;
    second control valve means arranged in the other of the first and the second pressure line for controlling a pressure therein to said calculated line pressure.

2. An apparatus according to claim 1, wherein said means for calculating actual engine torque comprises means for calculating a basic engine torque value from engine speed and the position of the throttle valve, means for calculating a correction factor for the detected atmospheric pressure, and means for obtaining an actual torque as a product of the basic value and the correction factor.

3. An apparatus for controlling a continuously variable transmission for a vehicle, which vehicle has an engine having a throttle valve, a torque control system for controlling a basic amount of fuel to be supplied to the engine, in accordance with the engine speed and a parameter of engine load, and a feed back system for controlling a correction amount of fuel to be added to the basic amount of fuel supplied to the engine said transmission comprising:

a hydraulically operated variable width first pulley assembly connected to the engine;
    a hydraulically operated variable width second pulley assembly connected to the vehicle;
    a belt looped between the first and the second pulleys for transmitting engine power to the vehicle;
    a liquid pressure source;
    first hydraulic line connecting said source with the first pulley assembly for generating a hydrualic pressure for engaging the first pulley with the belt;
    second hydraulic line connecting the source with the second pulley assembly for engaging the second pulley with the belt;
    first detecting means for detecting the position of the throttle valve;
    first calculating means for calculating a value of control pressure so as to obtain a speed ratio which is a ratio of the vehicle speed to the engine speed and is determined by the detected position of the throttle valve;
    first control valve means arranged in one of the first and the second hydraulic lines for controlling a pressure therein to said control pressure;
    second detecting means for detecting the engine speed;
    third detecting means for detecting the feed back correction amount of fuel as a parameter value of atmospheric pressure;
    means for calculating an actual torque as a function of the engine speed, throttle position and the detected parameter value of atmospheric pressure;
    second calculating means for calculating a value of line pressure so as to obtain the minimum pressure for engaging the belt with the pulley, which pressure is determined in accordance with the calculated engine torque, and;
    second control valve means arranged in the other of the first and second pressure line for controlling a pressure therein to said calculated line pressure.

4. An apparatus according to claim 3, wherein said means for calculating actual engine torque comprise means for calculating basic engine torque value from engine speed and the position of the throttle valve, means for calculating a correction factor from the detected feed back coorection factor, and means for obtaining an actual torque as a product of the basic value and the correction factor.

* * * * *